(12) United States Patent
Damme et al.

(10) Patent No.: US 8,034,896 B2
(45) Date of Patent: Oct. 11, 2011

(54) METHOD AND SYSTEM FOR DEGASSING POLYMER POWDER

(75) Inventors: Eric Damme, Arquennes (BE); Marc Moers, Antwerp (BE); Lieven Van Looveren, Mielen-Boven-Aalst (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 57 days.

(21) Appl. No.: 12/281,732

(22) PCT Filed: Mar. 6, 2007

(86) PCT No.: PCT/EP2007/052097
§ 371 (c)(1),
(2), (4) Date: Sep. 10, 2009

(87) PCT Pub. No.: WO2007/101854
PCT Pub. Date: Sep. 13, 2007

(65) Prior Publication Data
US 2010/0041825 A1  Feb. 18, 2010

(30) Foreign Application Priority Data
Mar. 7, 2006 (EP) .................................. 06110780

(51) Int. Cl.
*C08G 63/02* (2006.01)
*C08G 63/00* (2006.01)

(52) U.S. Cl. ........ 528/492; 422/100; 422/122; 422/139; 422/144; 422/145; 526/59; 526/64; 526/68; 526/72

(58) Field of Classification Search .................. 422/100, 422/122, 139, 144, 145; 526/59, 64, 68, 526/72; 528/492
See application file for complete search history.

(56) References Cited

FOREIGN PATENT DOCUMENTS

| | | |
|---|---|---|
| DE | 2449787 A1 | 4/1976 |
| DE | 152729 A1 | 12/1981 |
| DE | 4121810 A1 | 2/1993 |
| GB | 2271114 A | 6/1994 |

*Primary Examiner* — Terressa M Boykin (57) ABSTRACT

The present invention relates to a method for degassing polymer powder comprising flushing the polymer powder in a first chamber with a first flow of flushing gas, transferring the polymer powder into a second chamber and flushing the polymer powder with a second flow of flushing gas in said second chamber. The present invention also relates to a system suitable for carrying out this method.

17 Claims, 7 Drawing Sheets

METHOD AND SYSTEM FOR DEGASSING POLYMER POWDER

CROSS-REFERENCE TO RELATED APPLICATIONS

This application claims the benefit of PCT Appl. Ser. No. PCT/EP2007/052097, filed on Mar. 6, 2007, which claims the benefit of EP Appl. Ser. No. 06110780.1, filed on Mar. 7, 2006.

FIELD OF THE INVENTION

The present invention relates to a method for degassing polymer powder by flushing the polymer powder with a flow of flushing gas. The invention also relates to a system for degassing polymer powder.

BACKGROUND OF THE INVENTION

In the present description, by a polymerisation process, it is meant a process for polymerising at least one monomer, and a manufacturing process of a polymer is used in the meaning of the whole process, comprising the polymerisation process and any further treatments, such as degassing, additivation, compounding and/or pelletising.

In a polymerisation process, the polymer is typically recovered from the reactor in the form of a polymer powder, either as such or in slurry, depending on the process. The polymer powder also typically contains a certain amount of unreacted monomer and possibly residues of solvent that need to be removed from the powder before further use. This invention relates to cases wherein the monomer and possible solvent is in the form of gas at some point of the manufacturing process. The removal of these undesired gases in such cases is typically made by degassing the polymer powder by flushing it with a flow of flushing gas. In the case of polyolefin manufacture, the gases to be removed are usually hydrocarbon gases such as ethylene, propylene, hexene, butane, octene, decene etc. In this description, the term residual gas is used to designate the mixture of all the products that need to be removed from the polymer powder, including products that are in the form of liquids as well as gases. The term residual gas is also used interchangeably with the term hydrocarbons when discussing their elimination from the system.

One method for flushing a polymer powder consists in introducing the polymer powder in a purge column and injecting a flow of nitrogen gas to said column from the bottom. The nitrogen enters into contact with the polymer powder that in the case of polyolefins has a residence time of about 0.5 to 10 hours in the purge column. A flow of nitrogen and of residual gas exits the purge column via a gas outlet and is directed to an appropriate treatment device via a gas discharge line.

The inventors have found out that in a process of polymerising ethylene, the amount of undesired hydrocarbon gases in the final polyethylene powder (i.e. before pelletising) is too high for some applications, such as for applications where the final product is in contact with food.

OBJECTS AND SUMMARY OF THE INVENTION

It is an object of the present invention to provide a method for degassing a polymer powder that is more effective than the currently known methods. It is also an object to further decrease the amount of hydrocarbons at a powder outlet especially in a manufacturing process for polyethylene.

A further object of the present invention is to minimise the losses of residual gases and to decrease the costs of production. A yet another object of the invention is to enhance the recycling of the gases used in a polymer manufacturing process, such as the flushing gas.

At least one of the above objects is at least partially achieved by the means of the present invention, namely a method for degassing polymer powder comprising flushing the polymer powder in a first chamber with a first flow of flushing gas, transferring the polymer powder into a second chamber and flushing the polymer powder with a second flow of flushing gas in said second chamber.

The present invention further relates to a system for degassing polymer powder comprising a first chamber equipped with at least one gas inlet and at least one gas outlet for a flushing gas; means for transferring the polymer powder from said first chamber into a second chamber, and a second chamber equipped with at least one gas inlet and at least one gas outlet for a flushing gas.

DETAILED DESCRIPTION OF THE INVENTION

The present invention relates to a method for degassing polymer powder comprising flushing the polymer powder in a first chamber with a first flow of flushing gas, transferring the polymer powder into a second chamber and flushing the polymer powder with a second flow of flushing gas in said second chamber.

The present invention provides a method in which the polymer powder is degassed in two different chambers and in a manner more effective than in the currently known methods. In some known manufacturing processes, the polymer powder is first flushed, i.e. degassed in a purge column and then transferred into a feed bin of an extruder. In a feed bin of an extruder, typically a low flux of nitrogen is used to keep the polymer powder under an overpressure in order to avoid contamination with oxygen before the extrusion. The flux of nitrogen used is however insufficient for flushing the polymer powder in the sense flushing is used in this description.

The method according to the present invention is especially suitable for use in a slurry process, such as a loop process for manufacturing polyolefins such as polyethylene and polypropylene. The present invention thus allows the reduction of the amount of hydrocarbons at the powder outlet before extrusion, especially in a manufacturing process for polyethylene comprising two loop reactors in series.

The word "chamber" as used in this description means a physical entity in the form of an essentially closed space. A chamber can for example be a vessel, such as a bin or a column, or a vessel can be divided into two, three, four or more chambers.

When preparing a polyethylene with a loop process, the amount of hydrocarbons at the powder outlet of the first chamber can be for example about 50-100 ppm, and with the present method, the amount of hydrocarbons at the powder outlet of the second chamber can be reduced to as low as 5 ppm. The present invention thus allows the reduction of residual gases in the polymer powder to an amount well below the required limit and without increasing the time needed for degassing. Indeed, it is possible to reduce the final amount of hydrocarbons from 50 to 5 ppm with a total residence time of three hours (that is typically used in a process without a second flushing), when the residence time in the first chamber is about two hours and in the second chamber about one hour. The inventors were indeed surprised to find out that a second flushing reduces the amount of residual gas to such an extent. An increase in the residence time of the polymer powder or an increase in the flux of the flushing gas in the prior art methods would not have the same effect as the present invention.

According to an embodiment of the present invention, the first flow of flushing gas has a flux of 5-50 kg/h of nitrogen per ton/hour of polymer. Preferably a flux of more than 8 kg/h of nitrogen per ton/hour of polymer and on the other hand, a flux of less than 15 kg/h of nitrogen per ton/hour of polymer is used. According to another embodiment of the present invention, the second flow of flushing gas has a flux of 5-50 kg/h, of nitrogen per ton/hour of polymer. Preferably a flux of more than 8 kg/h of nitrogen per ton/hour of polymer and on the other hand, a flux of less than 20 kg/h of nitrogen per ton/hour of polymer is used.

According to an embodiment of the present invention, the transfer of the polymer powder is made by means of gravity. This means that the first and second chambers are placed on top of one another, and the polymer powder is allowed to flow freely from the first chamber to the second chamber. The powder outlet of the first chamber may also be equipped with a valve to control the flow of the polymer powder.

According to an alternative embodiment of the invention, the transfer of the polymer powder is made by means of a flow of a transfer gas, i.e. a pneumatic transfer. The transfer gas is injected into a flow of polymer powder at or near the powder outlet of the first chamber and it transfers the polymer powder to the second chamber, while at the same time mixing the polymer powder to some extent. The flux of the transfer gas is typically about 200 kg/h of transfer gas per ton of polymer, the velocity in the lines being typically about 20 m/s.

According to a preferred embodiment of the invention, the gases used for flushing and/or for transfer are inert gases, typically nitrogen. Inert gases are preferred in order to avoid any degradation of the product by oxygen and to avoid any risk of explosion.

The present invention further relates to a system for degassing polymer powder comprising
- a first chamber equipped with at least one gas inlet and at least one gas outlet for a flushing gas;
- means for transferring the polymer powder from said first chamber into a second chamber, and
- a second chamber equipped with at least one gas inlet and at least one gas outlet for a flushing gas.

The present invention thus relates to a system suitable for carrying out the method according to the present invention.

According to an embodiment of the present invention, the means for transferring the polymer powder is a transfer line. The transfer line may be any suitable line known per se for transfer or transport of a polymer powder. The transfer line may be a straight line that connects the first and second chambers positioned one above another or it may be a longer line, depending on the layout of the manufacturing system. The transfer may be made by gravity or by means of a transfer gas. Should the option of gravity be chosen, the transfer line is preferably equipped with a mixer in order to enhance the mixing of the polymer powder between the two chambers. Should a transfer gas be chosen, the transfer line is equipped with a gas inlet for a transfer gas. The transfer gas may circulate in a closed circuit, preferably equipped with appropriate means for eliminating any possible residues of polymer particles before the transfer gas is reused for transfer. The degassing can also be made to a certain extent in the transfer gas circuit, which is then equipped with appropriate devices for eliminating the degassed hydrocarbons. According to a preferred embodiment of the invention, the powder outlet of the chamber, at least of the first chamber, is equipped with a valve, preferably a rotary valve.

The system can comprise two different chambers. The chambers may be of any suitable kind known to a person skilled in the art. The system may also comprise three, four, five or more chambers equipped with gas inlets and outlets. According to an embodiment of the invention, the first chamber is a purge column. Said purge column can be for example positioned under a flash tank connected to a slurry reactor. The second chamber may be a feed bin, such as a feed bin of an extruder. The chambers used in the present invention may also comprise more than one gas inlet and gas outlet.

According to an embodiment of the present invention, the residence time of the polymer powder in the chambers is 0.5-10 hours. The residence time can be from 0.5, 1, 1.5, 2, 3 or 5 hours up to 1, 1.5, 2, 3, 5 or 10 hours.

According to an embodiment of the present invention, at least one of the chambers is equipped with a gas equilibration line joining a gas exit of a valve, located at or near the powder outlet of said chamber, back to said chamber at a position that is at a distance $h_1$ from a first end of the chamber, said distance $h_1$ being 0-25% of the height H of the chamber, and in that a valve is arranged on the gas line. According to a preferred embodiment, the position of the gas equilibration line at the upper end of the chamber is arranged such that it is essentially above the level of polymer powder when the system is in use. According to another embodiment of the invention, at least one of the chambers is equipped with a gas line joining a gas exit of a valve, located at or near the powder outlet of said chamber, to the inside of said chamber at a position that is at a distance $h_2$ from the first end of the chamber, said distance $h_2$ being 20-95% of the height H of the chamber and at a distance $l_1$ from a wall of said chamber, said distance $l_1$ being 0-50% of the largest diameter L of the chamber. According to a preferred embodiment, the injection is made at some distance from the wall of the chamber. According to a preferred embodiment, the position of the gas line at the upper end of the chamber and inside thereof, is arranged such that it is below the level of polymer powder when the system is in use. Also a combination of these equipments may be used.

The present invention thus also provides a system comprising an apparatus wherein the functioning of a valve arranged at the outlet of a chamber is improved. Therefore, a gas line is provided with a gas outlet that allows for at least a part of the gas from the powder outlet to be reintroduced into the chamber. From there, the gas is removed via the gas outlet at the upper end of the chamber i.e. the first end. As an additional or alternative feature, this introduction can be made inside the chamber such that it enters into contact with the polymer powder and is thus used for flushing. The use of at least one of these measures leads to a decrease of the cost of production of polymers. It is to be noticed that the gas that comes from the powder outlet of the first chamber and goes back to the chamber consists essentially of the transfer gas and only of a small fraction of flushing gas. This gas line may also be equipped with a suitable device for removing any polymer particles.

According to an embodiment of the invention, the distance $h_1$ is 0-15% of the height H of the chamber. This distance can also be from 0, 2, 5, 10 or 14% up to 3, 6, 9 or 15% of the height H of the chamber. By height it is meant here the dimension that separates the end of the chamber comprising the powder inlet, i.e. the first end from the end of the chamber comprising the powder outlet, i.e. the second end, these two being typically at opposite ends of the chamber. Should this not be the case, height is meant to mean the largest dimension of the chamber. Preferably the gas in this embodiment is re-introduced at the top of the vessel close to the wail, above the powder level.

According to another embodiment of the invention, the distance $h_2$ is 20-80% of the height H of the chamber. This distance can also be from 30, 35, 40, 45, 50, 55, 60, 65, 70 or 75% up to 35, 40, 45, 50, 55, 60, 65, 70, or 75% of the height H of the chamber. The distance $h_2$ is preferably from 30 to 80%, more preferably from 50 to 80% and most preferably from 70 to 80% of the height H of the chamber. Preferably, the gas line is placed at a height $h_2$ below the level of polymer powder when the system is in use.

According to an embodiment of the invention, the end of the gas line joining the chamber at this distance $h_2$ is arranged on the wall of the chamber. It is however possible to arrange this end also inside the chamber, for example at a distance $l_1$ from a wall of said chamber, said distance being $l_1$ 0-50% of the largest diameter L of the chamber. The largest diameter in the most typical case of cylindrical chambers is the diameter of the chamber in the transverse direction, i.e. at the direction of a plane perpendicular to a plane of the direction of the height. The distance $l_1$ can be from 0, 0.5, 1, 5, 13, 25, 30, 34, 40 or 45% up to 0.6, 2, 7, 15, 20, 30, 41 or 50% of the largest diameter L of the chamber. Preferably, distance $l_1$ is from 5 to 50%, more preferably from 25 to 50% and most preferably from 40 to 50% of the largest diameter L of the chamber. The distances of $l_1$ can be combined with any one of the distances of $h_2$ given in the embodiment above.

According to a preferred embodiment of the invention, the valve arranged at the powder outlet of the chamber is a rotary valve. Any other type of valve or device can be used, as is readily clear to a person skilled in the art depending on the equipment following the chamber. For example, slide valves or screws can be used. According to another embodiment of the invention, the second valve, i.e. that arranged on the gas line is a ball valve. Any other valve used with powder may also be used, a slide valve being preferred when the powder is transferred by gravity flow.

In the present invention, if is also possible to use any other transfer system, such as a transfer vessel. If is also naturally possible to use two or more of the systems according to the present invention in parallel.

The further details and embodiments described above in connection with the method also apply to the system according to the invention. Moreover, the details and embodiments described above in connection with the system also apply to the method according to the invention.

The present invention also relates to the use of a system according to the present invention in a polyolefin manufacturing process comprising two loop reactors in series. The details and embodiments described above in connection with the method and system also apply to the use according to the invention.

In any of the embodiments described above, any gas outlet within a chamber may be equipped with a device suitable for distributing the gas more uniformly within the chamber. Such a device can be for example a screen in the form of a cone. Also, it is possible to use a manifold with multiple injection points.

The invention can also be implemented by appropriately combining two or more embodiments mentioned in this description.

The invention is described in more detail in the following description of the Figures and in the Experimental part. This description is only intended to give some examples of the invention and is not to be construed as limiting the scope of the invention. Moreover, the reference marks in the claims are merely indicative and are not to be construed as limiting the scope of protection.

DETAILED DESCRIPTION OF THE DRAWING

Figure 1:
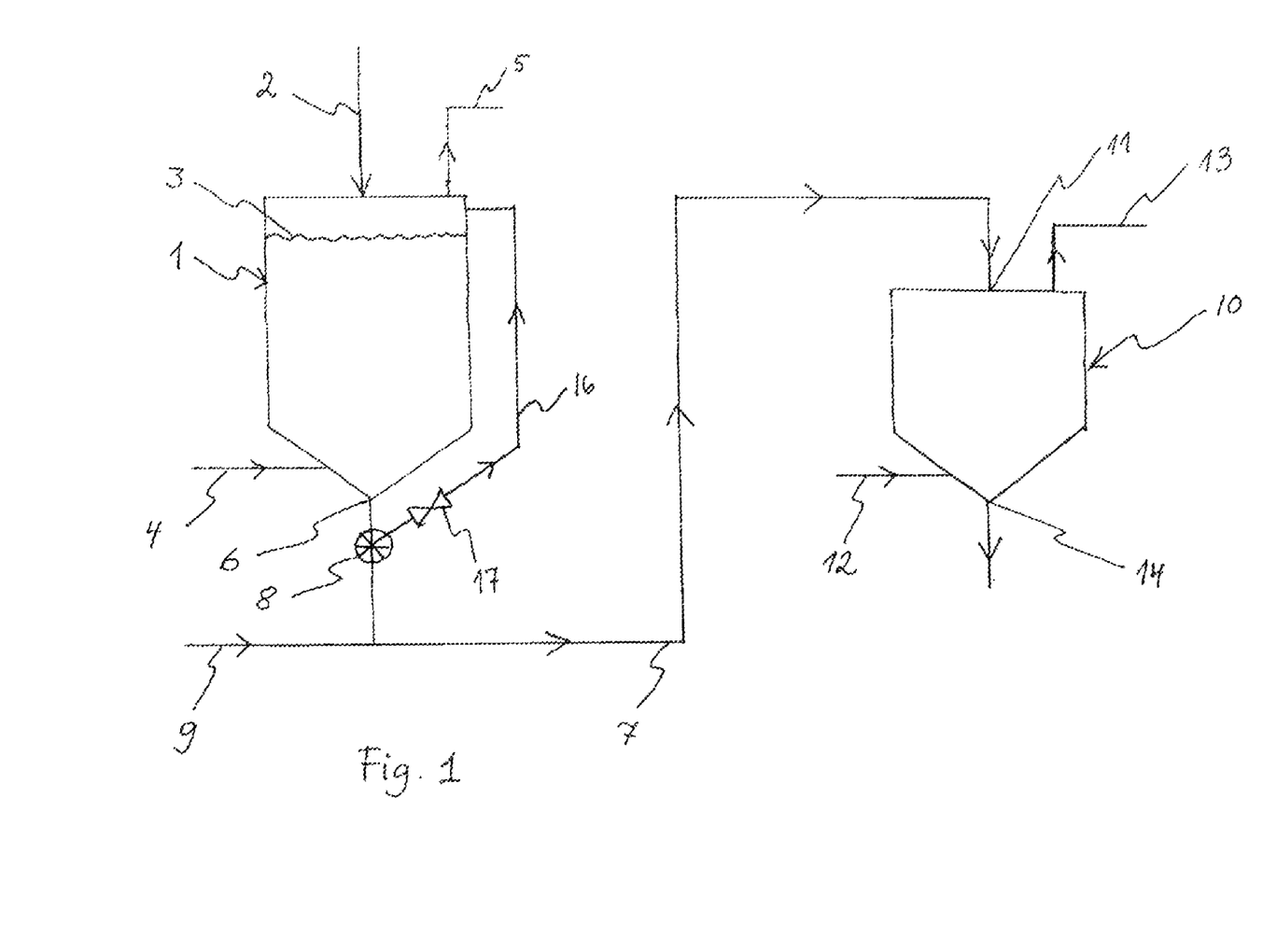
FIG. 1 shows schematically a system according to a first embodiment of the invention.

FIG. 1 shows schematically a system according to a first embodiment of the invention. In this embodiment, the system comprises a first chamber 1 that is a purge column. Polymer powder enters the first chamber 1 by feed line 2 via a powder inlet. The level of the polymer powder is represented schematically at the reference number 3. A flow 4 of flushing gas, here nitrogen, enters the first chamber 1 via a flushing gas inlet arranged at the bottom part (second end) of the first chamber 1. The flow of nitrogen enters into contact with the polymer powder within chamber 1 and removes a part of the residual gases present in the polymer powder. A flow 5 of nitrogen and residual gas then exits the first chamber 1 via a gas outlet arranged at the top part (first end) of the first chamber 1

From the powder outlet 6, the polymer powder enters a transfer line 7, equipped with a valve 8, which is a rotational valve in this case. A flow of transfer gas 9 enters into contact with the polymer powder and transfers the polymer powder to a powder inlet 11 of a second chamber 10, which in this case is a feed bin. Said second chamber 10 is also equipped with a gas inlet and a gas outlet, and a flow 12 of flushing gas, also nitrogen, enters the second chamber 10 at said gas inlet arranged at the bottom part of the second chamber 10, and a flow 13 of nitrogen and residual gas exits the second chamber 10 by said gas outlet.

The system according to this embodiment is further equipped with an additional apparatus for allowing the correct functioning of the valve 8. This apparatus consists in an additional gas line 16 joining a gas exit or outlet of the valve 8 to the upper part of the first chamber 1. This gas line 16 is provided with a valve 17 for opening and closing said gas line 16.

Figure 2:
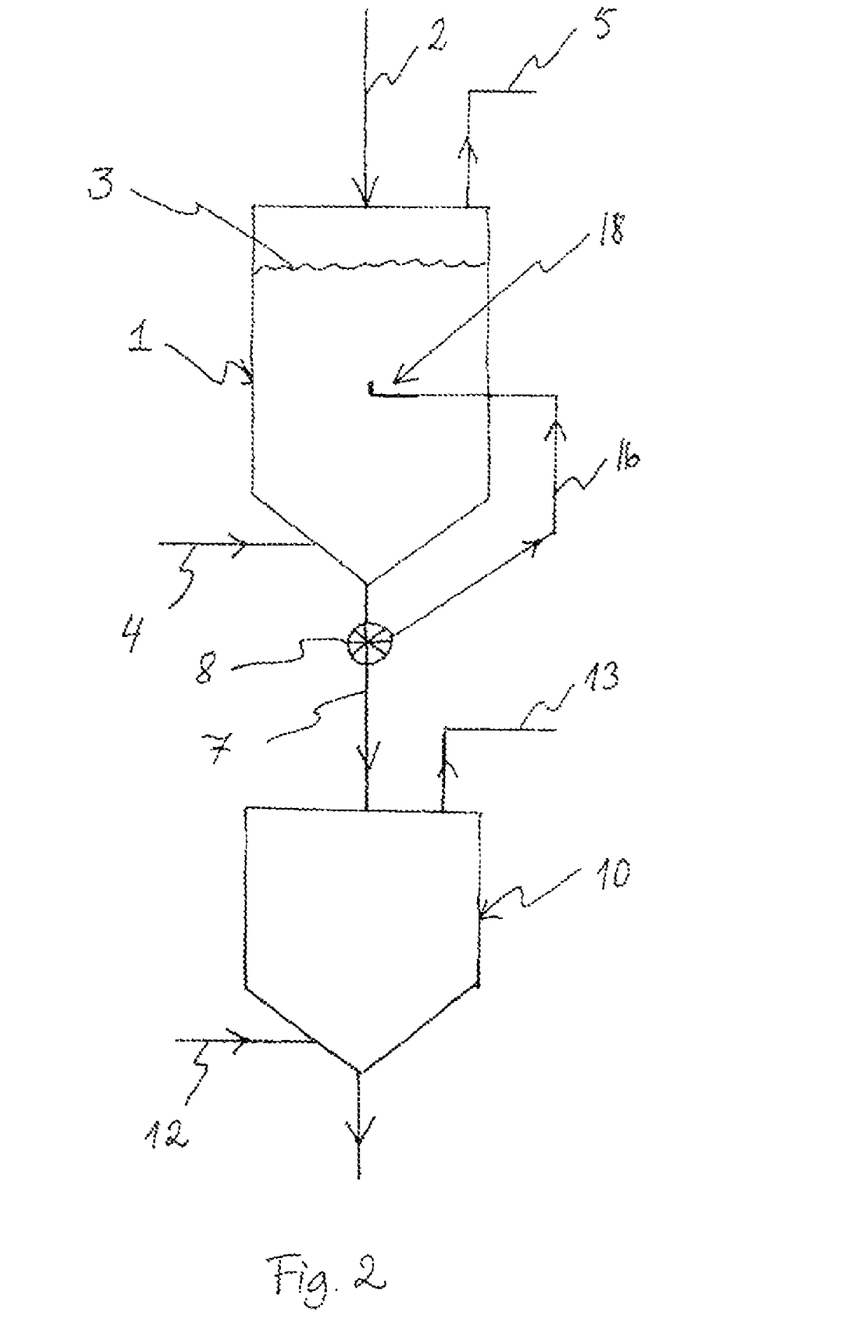
FIG. 2 shows schematically a system according to a second embodiment of the invention.

FIG. 2 shows schematically a system according to a second embodiment of the invention. This embodiment differs from the first embodiment in that the first and second chambers are arranged so that the first chamber 1 is on top of the second chamber 10 and the transfer line 7 is not equipped with a transfer gas inlet. The transfer of polymer powder from the first chamber 1 to the second chamber 10 is thus made by gravity.

The system according to this embodiment is also equipped with an additional apparatus for reducing the losses of the flushing gas in the first chamber 1 and for recycling the flushing gas in said first chamber 1. This second additional apparatus is different from the first additional apparatus explained in connection with FIG. 1 or 4 in that the gas line 16 does not comprise a valve and in that its second end (its first end being connected to the valve 8) is positioned inside the first chamber 1 at a position that is in the centre of the chamber when seen in transverse direction and approximately in the centre of the chamber when seen in height direction.

Figure 3:
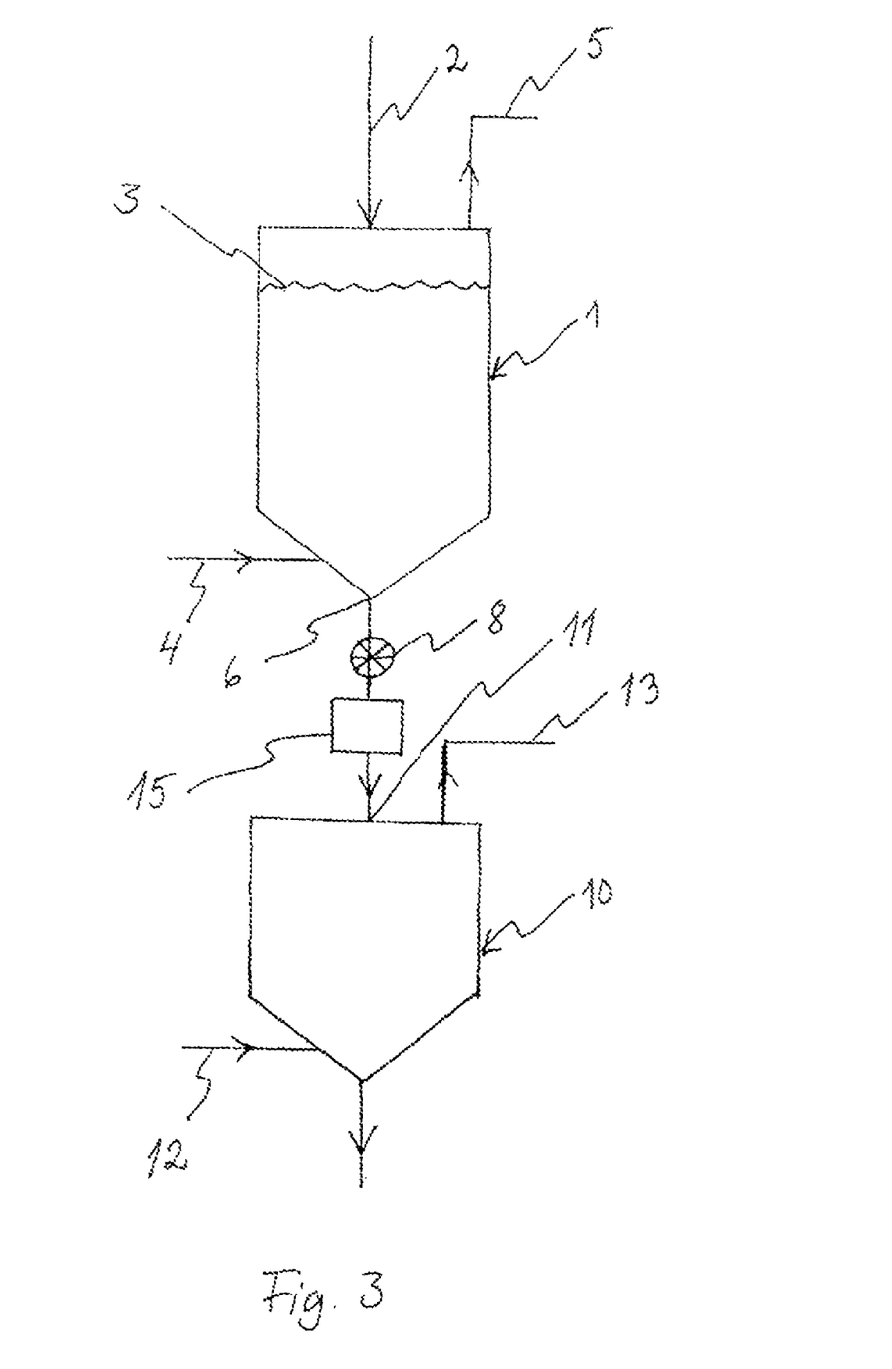
FIG. 3 shows schematically a system according to a third embodiment of the invention.

FIG. 3 shows schematically a system according to a third embodiment of the invention. This embodiment differs from the second embodiment in that a mixer 15 is arranged between the rotational valve 8 and the powder inlet 11 of the second chamber 10. The mixer 15 further enhances the mixing of the polymer powder entering the second chamber 10. The system described in FIG. 3 can also be equipped with an apparatus explained in connection with FIG. 2 or 5, although for sake of clarity it is not shown here.

Figure 4:
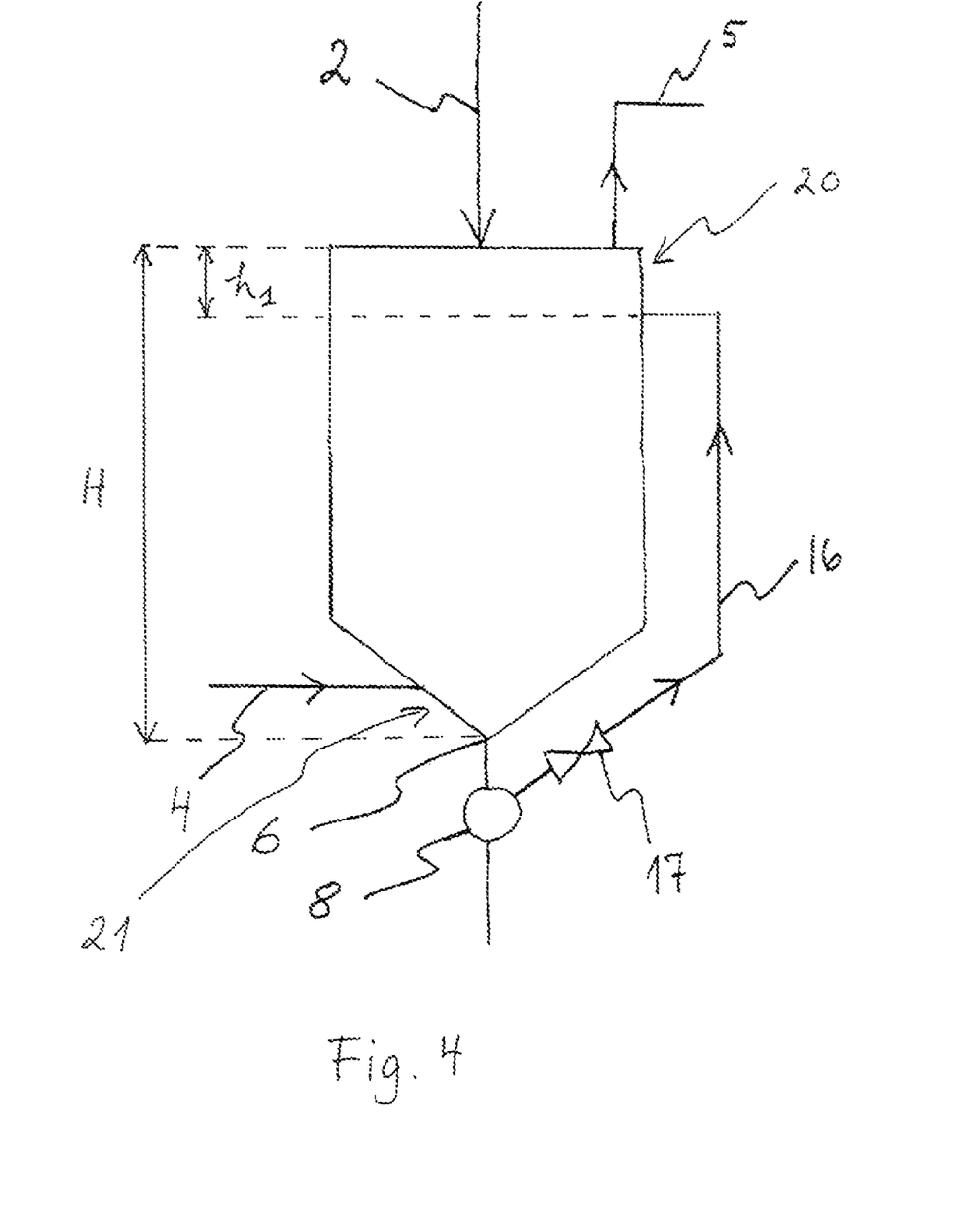
FIG. 4 shows schematically a part of a system according to a fourth embodiment of the invention.

FIG. 4 shows schematically a part of a system according to a fourth embodiment of the invention. In this embodiment a gas line 16 has its first end connected to a gas exit of a valve 8 positioned at the bottom of the chamber for outgoing polymer powder. The valve 8 is provided with a gas outlet that allows the valve 8 to function properly, some gas from the valve 8 being sent to the top of the chamber. The second end of the gas line 16 is thus positioned on the upper part of the chamber, at a height $h_1$, which in this embodiment is approximately 15% of the height H of the chamber, measured from the upper end of the chamber, i.e. from the end wherein the polymer powder enters the chamber, and above the level of the powder. From there, the residual flushing gas is removed via the gas outlet 5. A valve 17 is provided on the gas line 16 for opening and closing it. Typically, the valve is opened during the start of the manufacturing process and is closed once the process runs steadily.

Figure 5:
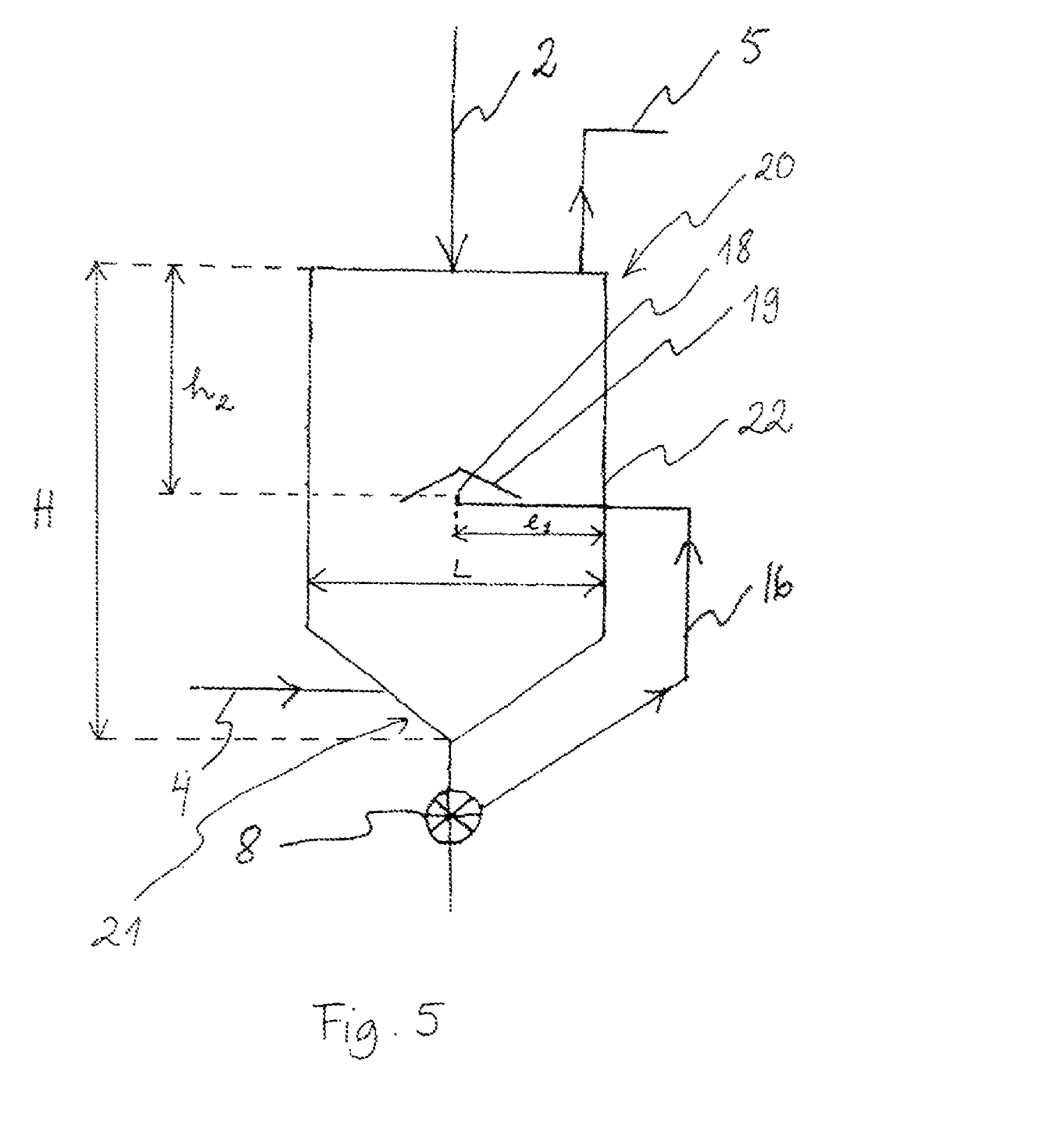
FIG. 5 shows schematically a part of a system according to a fifth embodiment of the invention.

FIG. 5 shows schematically a part of a system according to a fifth embodiment of the invention. This embodiment differs from the embodiment explained in connection with FIG. 4 in that the gas line 16 does not comprise a valve and in that its second end 18 (its first end being connected to the valve 8) is positioned inside the chamber. The position of the second end 18 is in this embodiment in height $h_2$ approximately 48% of the height H of the chamber, measured from the upper end of the chamber, and in the transverse direction L approximately in the middle of the reactor, i.e. at a length $l_1$ that is about 50% of the maximum length L of the chamber and below the powder level. The second end 18 of the gas line 16 is moreover equipped with a screen 19 in the form of a cone. This screen 19 allows for a more uniform distribution of the flushing gas entering the chamber from the second end 18 of the gas line 16. The flushing gas then enters into contact with the polymer powder instead of being immediately discarded through the gas outlet 5.

Figure 6:
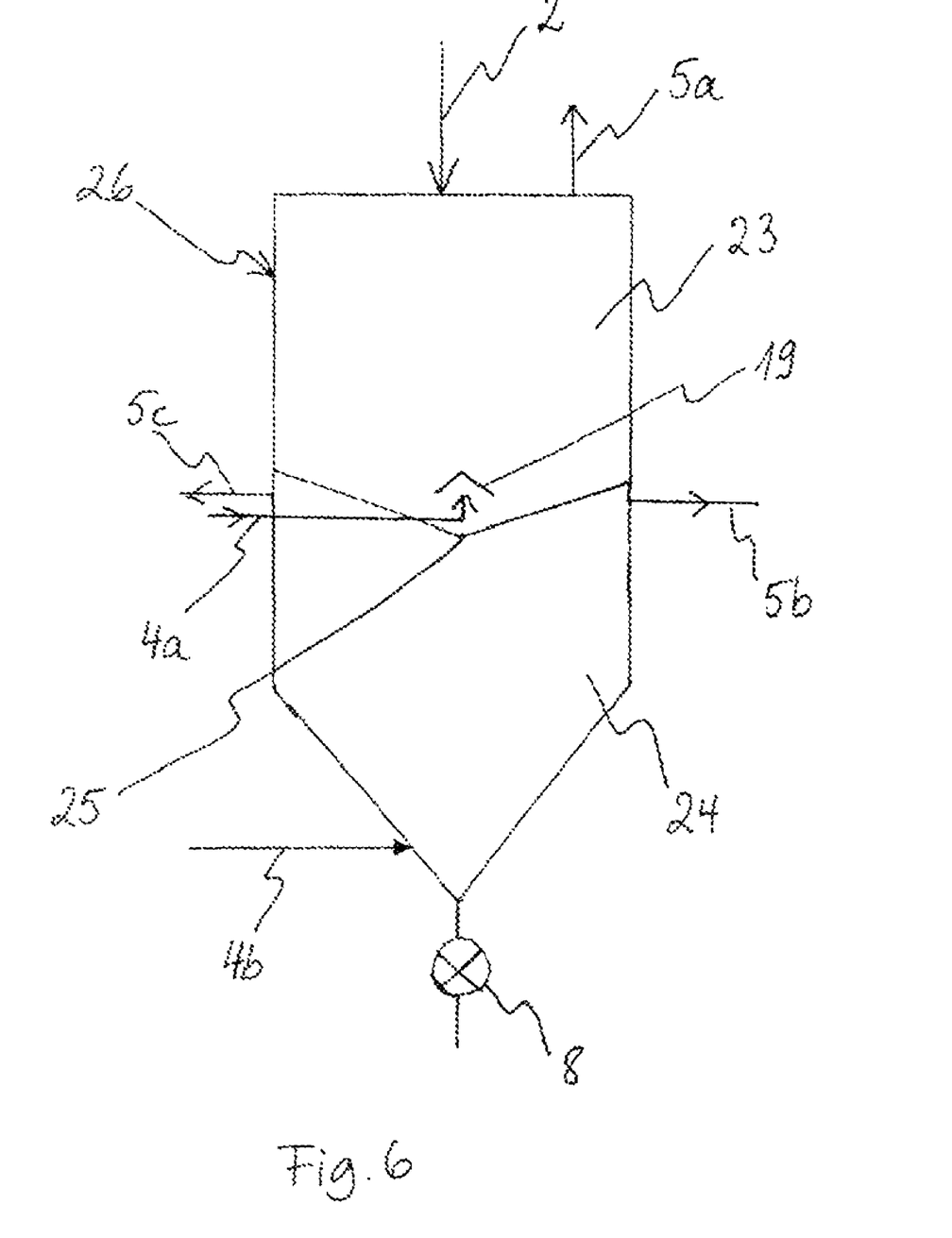
FIG. 6 shows schematically a system according to a sixth embodiment of the invention.

FIG. 5 shows schematically a system according to a sixth embodiment of the invention, in this embodiment, the chambers 23 and 24 are positioned one above another in one vessel 26. The polymer powder is transferred from chamber 23 to chamber 24 through an orifice 25. The first chamber 23 is equipped with a gas outlet 5a and the chamber 24 is in this embodiment equipped with two gas outlets 5b and 5c. Both chambers are also equipped with flushing gas inlets 4a and 4b.

Figure 7:
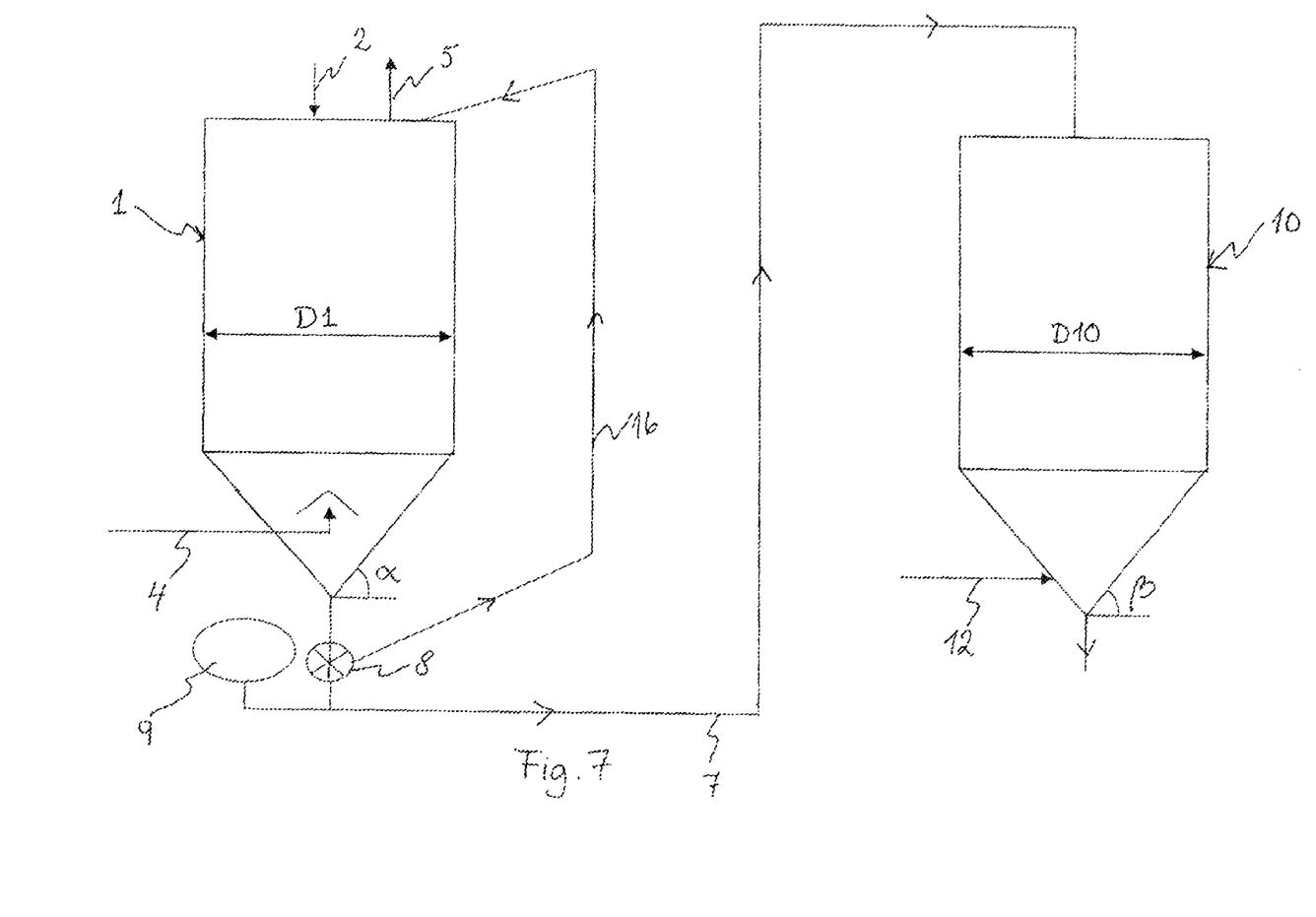
FIG. 7 shows schematically a system according to a seventh embodiment of the invention.

FIG. 7 shows schematically a system according to a seventh embodiment of the invention. This embodiment was used in the Experimental part and will be described in more detail therein.

EXPERIMENTAL PART

A system according to the invention was tested, in this system, first and second chambers were cylindrical and the diameter D1 of the first chamber 1 was 2.8 m and the angle α at the bottom part of chamber 1 was 70°. The volume of the first chamber, here purge column was 100 m³ and flushing gas, here nitrogen, was injected to the purge column through a screen.

The diameter D10 of the second chamber 10 was 5 m and the angle β at the bottom part of chamber 10 was 60°. The volume of the second chamber, here feed bin, was 400 m³ and flushing gas, here nitrogen, was injected to the feed bin through a manifold with eight injection nozzles located at about 2 m from the bottom of the cone. Valve 8 was a rotary valve.

The system was used for degassing polyethylene coming from a double loop reactor, the polymer having a density of 0.949 g/cm³, a high load melt index HLMI of 8 g/10 min. The bulk density of the polymer was 450 g/l. The hydrocarbons stripped from the polymer powder were mainly 1-hexene, that had been used as a comonomer in the polymerisation process.

The system according to FIG. 7 was tested in Examples 1-4. The conditions are listed in Table 1. Example 1 is a comparative example, in which the flow of nitrogen in the feed bin is 30 kg/h. At a polymer feed rate of 15 ton/hour, this is a flux of 2 kg/h of nitrogen per ton/hour of polymer, which is insufficient for having a flushing effect. In Examples 2 to 4 the flux of nitrogen is increased to 150 kg/h, which is the equivalent of a flux of 10 kg/h of nitrogen per ton/hour of polymer. Examples 5 and 6 use the same system except that the nitrogen is reinjected in the middle of the purge column.

As can be seen from Table 1, when comparing for example Examples 1 and 2, when the nitrogen flow in the purge column is reduced by 50%, and the nitrogen flow in the feed bin is increased by 500%, the total flow of nitrogen decreasing from 330 to 300 kg/h, the amount of hydrocarbons at the outlet of the feed bin is decreased from 55 to 6 ppm. It can also be seen when looking at Example 3, that if the level of polymer in the purge column is decreased from 90 to 55%, and the residence time decreased from about 2.5 hours to 1.5 hours, the amount of hydrocarbons at the end of the system is 10 ppm in stead of 6 ppm, i.e. still ⅕ of the amount in a typical process. In Example 4, it was noticed that when the amount of polymer in the feed bin and its residence time therein are increased, the amount of hydrocarbons at the end is even smaller, i.e. 4 ppm.

Examples 5 and 6 show the effect of the injection of the equilibration gas in the middle of the silo at a distance $h_2$ of about 48% of height H and at distance $l_1$ of about 50% of the largest diameter L, according to a system shown partly in FIG. 5. In Example 6, the amount of transfer gas required is only half of that in Example 5, since due to the halved transfer pressure only half as much nitrogen gas is needed to rebalance the pressure in the nitrogen recycle unit. This clearly shows that with less nitrogen it is possible to have the same amount of hydrocarbons at the outlet, 55 ppm in both Examples 5 and 6.

In Example 7, the system shown partly in FIG. 5 is further equipped with a valve on the gas line 16. It can be seen that when this valve is closed, the rotary valve leakage is reduced to less than ⅓. This has a further effect of reducing the amount of inert gases in the polymer powder to be purged, and thus increasing the concentration of hydrocarbons. Therefore, it is easier to recover the hydrocarbons, as the recovery is typically made by a condensation/distillation system. The inert gases decrease the efficiency of the recovery section. The losses in the recovery section are more or less proportional to the presence of inert gases.

TABLE 1

|  |  | Example 1 | Example 2 | Example 3 | Example 4 | Example 5 | Example 6 | Example 7 |
|---|---|---|---|---|---|---|---|---|
| PURGE COLUMN | | | | | | | | |
| Polymer feed rate to purge column | ton/hour | 15 | 15 | 15 | 15 | 15 | 15 | 15 |
| Hydrocarbons at powder inlet of purge column | ppm | 6000 | 6000 | 6000 | 6000 | 6000 | 6000 | 6000 |
| Nitrogen flow to purge column | kg/h | 300 | 150 | 150 | 150 | 200 | 250 | 300 |
| Level of polymer in purge column | % | 90 | 90 | 55 | 90 | 90 | 90 | 90 |
| Hold-up in purge column | tons | 37.8 | 37.8 | 23.1 | 37.8 | 37.8 | 37.8 | 37.8 |
| Residence time | hours | 2.52 | 2.52 | 1.54 | 2.52 | 2.52 | 2.52 | 2.52 |
| Hydrocarbons at powder outlet of purge column | ppm | 60 | 75 | 100 | 75 | 60 | 61 | 61 |
| Hydrocarbon in purge stream | kg/h | 89.1 | 88.9 | 88.5 | 88.9 | 89.1 | 89.1 | 89.1 |
| Hydrocarbon concentration in the outgoing gas flow | weight-% | 17 | 24 | 24 | 24 | 22 | 22 | 22 |
| TRANSFER | | | | | | | | |
| Transfer pressure | mbar | 700 | 700 | 700 | 700 | 700 | 350 | 350 |
| Rotary valve leakage | kg/h | 125 | 125 | 125 | 125 | 125 | 62.5 | 20 |
| Reinjection of nitrogen | | top | top | top | top | middle | middle | none |
| FEED BIN | | | | | | | | |
| Level of polymer in feed bin | % | 10 | 10 | 10 | 50 | 10 | 10 | 10 |
| Hold-up in feed bin | tons | 16.8 | 16.8 | 16.8 | 84 | 16.8 | 16.8 | 16.8 |
| Residence time | hour | 1.12 | 1.12 | 1.12 | 5.6 | 1.12 | 1.12 | 1.12 |
| Nitrogen flow to feed bin | kg/h | 30 | 150 | 150 | 150 | 30 | 30 | 30 |
| Hydrocarbons in powder at the outlet of the feed bin | ppm | 55 | 6 | 10 | 4 | 55 | 55 | 55 |
| Total residence time in system | hour | 3.64 | 3.64 | 2.66 | 8.12 | | | |

The invention claimed is:

1. A Method for degassing polymer powder comprising:
flushing a polymer powder in a first chamber with a flow of flushing gas; transferring the polymer powder from the first chamber into a second chamber; and
flushing the polymer powder with a second flow of flushing gas in a second chamber.

2. The method of claim 1, wherein the transfer of the polymer powder is made by gravity.

3. The method of claim 1, wherein transfer of the polymer powder is made by flow of a transfer gas.

4. The method of claim 1, wherein the first flow of flushing gas has a flux of 5-50 kg/h of flushing gas per ton/hour of polymer.

5. The method of claim 1, wherein the second flow of flushing gas has a flux of 5-50 kg/h of flushing gas per ton/hour of polymer.

6. The method of claim 1, wherein at least a part of flushing gas of at least one of the chambers exiting said chamber through a powder outlet is re-introduced into said chamber.

7. The method of claim 1, wherein the flushing gas is an inert gas.

8. The method of claim 7, wherein the inert gas is nitrogen.

9. A system for degassing polymer powder comprising:
a first chamber equipped with at least one gas inlet and at least one gas outlet for a flushing gas;
means for transferring the polymer powder from the first chamber into a second chamber, and
a second chamber equipped with at least one gas inlet and at least one gas outlet for a flushing gas.

10. The system of claim 9, wherein the means for transferring the polymer powder is a transfer line.

11. The system of claim 9, wherein the transfer line is equipped with a mixer.

12. The system of claim 9, wherein the transfer line is equipped with a gas inlet for a transfer gas.

13. The system of claim 9, wherein at least one of the chambers is equipped with a gas line joining a gas exit of a first valve arranged at a powder outlet of the chamber back to the chamber at a position that is at a distance from a first end of the chamber, said distance being less than 25% of a height of the chamber, and in that a second valve is arranged on the gas line.

14. The system of claim 9, wherein at least one of the chambers is equipped with a gas line joining a gas exit of a valve arranged at a powder outlet of said chamber back to the inside of said chamber at a position that is at a distance from a first end of the chamber, said distance being 20-80% of a height of the chamber and at a distance from a wall of said chamber, said distance being 0-50% of a largest diameter of the chamber.

15. The system of claim 9, wherein the first chamber, second chamber or combinations thereof is a vessel.

16. The system of claim 9, wherein the first chamber is a purge column.

17. The system of claim 9, wherein the second chamber is a feed bin.

* * * * *